US012676308B2

(12) United States Patent
Yoshikawa et al.

(10) Patent No.: US 12,676,308 B2
(45) Date of Patent: Jul. 7, 2026

(54) ACTIVE MATERIAL PARTICLE, ELECTRODE, ENERGY STORAGE DEVICE, ALL-SOLID-STATE SECONDARY BATTERY, METHOD FOR PRODUCING ACTIVE MATERIAL PARTICLES, AND ENERGY STORAGE APPARATUS

(71) Applicant: GS Yuasa International Ltd., Kyoto (JP)

(72) Inventors: Daisuke Yoshikawa, Kyoto (JP); Motoshi Suyama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 554 days.

(21) Appl. No.: 18/274,402

(22) PCT Filed: Jan. 24, 2022

(86) PCT No.: PCT/JP2022/002444
§ 371 (c)(1),
(2) Date: Jul. 26, 2023

(87) PCT Pub. No.: WO2022/163585
PCT Pub. Date: Aug. 4, 2022

(65) Prior Publication Data
US 2024/0097129 A1    Mar. 21, 2024

(30) Foreign Application Priority Data

Jan. 29, 2021    (JP) ................................. 2021-013709
Aug. 23, 2021    (JP) ................................. 2021-135750

(51) Int. Cl.
*H01M 4/58*        (2010.01)
*C01B 25/45*       (2006.01)
(Continued)

(52) U.S. Cl.
CPC ........... *H01M 4/5825* (2013.01); *C01B 25/45* (2013.01); *H01G 11/30* (2013.01); *H01M 4/366* (2013.01);
(Continued)

(58) Field of Classification Search
CPC .... H01M 4/5825; H01M 4/366; H01M 4/505; H01M 4/525; C01B 25/45; H01G 11/30; C01P 2006/40
(Continued)

(56) References Cited

U.S. PATENT DOCUMENTS 7,993,782 B2    8/2011  Takada et al.
9,391,328 B2    7/2016  Tsuchida et al.
(Continued)

FOREIGN PATENT DOCUMENTS

JP        2011-233246 A    11/2011
JP        2013-26003 A     2/2013
(Continued)

OTHER PUBLICATIONS

International Search Report (ISR) dated Apr. 19, 2022 filed in PCT/JP2022/002444.

*Primary Examiner* — James M Erwin
(74) *Attorney, Agent, or Firm* — RANKIN, HILL & CLARK LLP

(57)        ABSTRACT

An active material particle according to an aspect of the present invention includes an active material base material and a covering layer covering at least a part of a surface of the active material base material, in which the covering layer contains niobium atoms and phosphorus atoms, and a content of the phosphorus atoms with respect to a total content of the niobium atoms and the phosphorus atoms in the covering layer is more than 0 mol % and 80 mol % or less.

12 Claims, 1 Drawing Sheet

(51) Int. Cl.

| | |
|---|---|
| *H01G 11/30* | (2013.01) |
| *H01M 4/36* | (2006.01) |
| *H01M 4/505* | (2010.01) |
| *H01M 4/525* | (2010.01) |

(52) U.S. Cl.
CPC ........... *H01M 4/505* (2013.01); *H01M 4/525* (2013.01); *C01P 2006/40* (2013.01)

(58) Field of Classification Search
USPC ......................................................... 429/149
See application file for complete search history.

(56) References Cited

U.S. PATENT DOCUMENTS

| | | | |
|---|---|---|---|
| 10,230,099 B2 | 3/2019 | Uchiyama | |
| 10,763,499 B2 | 9/2020 | Matsuyama et al. | |
| 11,063,247 B2 | 7/2021 | Choi et al. | |
| 11,228,033 B2 | 1/2022 | Nakura et al. | |
| 11,581,522 B2 | 2/2023 | Choi et al. | |
| 2009/0081554 A1 | 3/2009 | Takada et al. | |
| 2013/0040193 A1 | 2/2013 | Tsuchida et al. | |
| 2014/0057176 A1* | 2/2014 | Park | H01M 4/1391 |
| | | | 429/231.8 |
| 2014/0178768 A1 | 6/2014 | Uchiyama et al. | |
| 2015/0024280 A1 | 1/2015 | Uchiyama | |
| 2015/0372344 A1* | 12/2015 | Iwasaki | H01M 4/131 |
| | | | 429/304 |
| 2016/0141608 A1* | 5/2016 | Ryu | H01M 4/38 |
| | | | 429/231.95 |
| 2017/0077504 A1* | 3/2017 | Ise | H01M 4/485 |
| 2019/0148719 A1 | 5/2019 | Kouzaki et al. | |
| 2019/0260018 A1 | 8/2019 | Matsuyama et al. | |
| 2020/0067072 A1 | 2/2020 | Choi et al. | |
| 2020/0075946 A1 | 3/2020 | Nakura et al. | |
| 2020/0091513 A1* | 3/2020 | Harada | H01M 50/202 |
| 2021/0135199 A1 | 5/2021 | Washida et al. | |
| 2021/0288309 A1 | 9/2021 | Choi et al. | |
| 2021/0367227 A1* | 11/2021 | Hao | H01M 4/131 |

FOREIGN PATENT DOCUMENTS

| | | | |
|---|---|---|---|
| JP | 2013-37950 A | 2/2013 | |
| JP | 2015-72772 A | 4/2015 | |
| JP | 2016-39062 A | 3/2016 | |
| JP | 2016-81822 A | 5/2016 | |
| JP | 2017-91913 A | 5/2017 | |
| JP | 2017-191667 A | 10/2017 | |
| JP | 2019-91686 A | 6/2019 | |
| JP | 2020-31052 A | 2/2020 | |
| JP | 2020-43052 A | 3/2020 | |
| WO | 2007/004590 A1 | 1/2007 | |
| WO | 2012/160707 A1 | 11/2012 | |
| WO | 2018/012522 A1 | 1/2018 | |
| WO | 2019/035418 A1 | 2/2019 | |

\* cited by examiner

ACTIVE MATERIAL PARTICLE, ELECTRODE, ENERGY STORAGE DEVICE, ALL-SOLID-STATE SECONDARY BATTERY, METHOD FOR PRODUCING ACTIVE MATERIAL PARTICLES, AND ENERGY STORAGE APPARATUS

TECHNICAL FIELD

The present invention relates to an active material particle (hereinafter, also referred to as a positive active material for an all-solid-state secondary battery, or simply as an active material), an electrode (hereinafter, also referred to as an electrode for an all-solid-state secondary battery), an energy storage device, an all-solid-state secondary battery (hereinafter, also referred to as an all-solid-state battery), a method for producing active material particles, and an energy storage apparatus.

BACKGROUND ART

A lithium ion secondary battery is widely in use for electronic equipment such as personal computers and communication terminals, automobiles, and the like because the battery has high energy density. The lithium ion secondary battery generally includes a pair of electrodes, which are electrically separated from each other by a separator, and a nonaqueous electrolyte interposed between the electrodes, and is configured to allow lithium ions to be transferred between the two electrodes for charge-discharge. A capacitor such as a lithium ion capacitor is also widely in use as an energy storage device except for the lithium ion secondary battery. Lithium ion secondary batteries available on the market today require careful storage and handling not only during an in-service period but also after the end of life because the electrolyte contains a flammable organic solvent. Under such circumstances, energy storage devices using a solid-state electrolyte as a nonaqueous electrolyte, such as all-solid-state batteries, have also been developed.

In particular, as active materials that can be suitably applied to all-solid-state batteries, various active material particles whose surfaces are covered with, for example, an oxide having lithium ion conductivity have been heretofore developed. Patent Document 1 discloses a composite positive active material of a sulfide all-solid-state lithium battery in which the surfaces of secondary particles of the positive active material having an olivine structure are covered with lithium niobium oxide.

In Patent Document 2, as Example 1, "In a dry nitrogen atmosphere, 8 mg of ethoxylithium (manufactured by Kojundo Chemical Lab. Co., Ltd.) was dissolved in 370 ml of dehydrated ethanol having a moisture content of 0.005% by weight or less (manufactured by Wako Pure Chemical Industries, Ltd.). Next, 48 mg of pentaethoxyniobium (manufactured by Kojundo Chemical Lab. Co., Ltd.) was dissolved, and the solution was thoroughly stirred. A precursor solution was obtained, which was confirmed to be free of precipitates. Next, as pretreatment, 500 g of nickel cobalt lithium manganese oxide ($LiNi_{1/3}Co_{1/3}Mn_{1/3}O_2$, manufactured by Nichia Corporation) as a positive active material was dried in a vacuum (120° C., 10 h) in advance. Thereafter, the precursor solution was applied to the positive active material in a dry nitrogen atmosphere (dew point temperature: −80° C. or lower) using a rolling fluidized bed coating apparatus (manufactured by Powrex Corporation). Subsequently, in a dry air atmosphere (dew point temperature: −50° C. or lower), 50 g of the positive active material coated with the precursor solution was put in an alumina crucible, and heat-treated (400° C., 30 min) in a muffle furnace to form a reaction inhibition layer, thereby obtaining a composite positive active material" (paragraph [0088]). In addition, according to this document, as Example 2, "a composite positive active material was produced in the same manner as in Example 1 except that lithium cobalt oxide ($LiCoO_2$, manufactured by Nichia Corporation) was used as a positive active material" (paragraph [0089]). Further, according to this document, the composite positive active material obtained in each of Examples 1 and 2 has a reaction inhibition layer formed on a surface of a positive active material, and the reaction inhibition layer contains a niobium oxide compound and a carbonaceous material (paragraph [0094]).

In Patent Document 3, as Example 4, "0.60 g of lithium hydroxide and 0.614 g of lithium fluoride were dissolved in 19.6 g of a Nb hydroxide slurry (containing Nb hydroxide at 9.6 wt %) to prepare a surface treatment liquid" and "This surface treatment liquid was added dropwise to 30 g of a lithium-containing composite oxide ($LiCo_{0.2}Ni_{0.6}Mn_{0.2}O_2$), and the operation of drying the mixture at 120° C. and performing mixing by a ball mill for 20 minutes was repeated three times. Thereafter, the mixture was fired in the air at 350° C. to obtain a positive active material (sample) (paragraph [0049]). In addition, the following is a part of this document. "The positive active material (sample) produced in each of examples and comparative examples was used as a positive active material, graphite (Gr) powder was used as a negative active material, and powder represented by the composition formula: $Li_{5.8}PS_{4.8}Cl_{1.2}$ was used as solid electrolyte powder", "The positive composite material powder was prepared by mixing the positive active material (sample) produced in each of examples and comparative examples, solid electrolyte powder, and conductive material (acetylene black) powder at a ratio of 60:37:3 in a mortar", "14.5 mg of positive composite material powder was filled into an insulating cylinder (p 9 mm) of a sealed cell, and uniaxially molded at 500 MPa to produce a positive composite material powder pellet, the obtained positive pellet was transferred into an insulating cylinder (p 10.5 mm) of a sealed cell, and 100 mg of solid electrolyte powder was filled on the positive pellet. Next, this was uniaxially molded at 184 MPa together with the positive composite pellet, 18 mg of graphite (Gr) powder was then filled on the solid electrolyte, and uniaxial molding was performed at 551 MPa, followed by tightening with a pressure screw to produce an all-solid-state lithium secondary battery", "The battery characteristics were evaluated by putting the all-solid-state lithium secondary battery cell in an environmental tester maintained at 25° C. and connecting the cell to a charge-discharge measurement apparatus. Here, charge was performed by a CC-CV method with the upper limit voltage set to 4.5 V, and discharge was performed by a CC method with the lower limit voltage set to 2.5 V", "The battery was charged and discharged at 0.1 C in each of the first to third cycles, charged at 0.2 C and discharged at 2.0 C in the fourth cycle, and charged and discharged at 0.1 C in each of the fifth to 51st cycles", and "The initial charge-discharge efficiency was expressed as a quotient obtained by dividing the discharge capacity at the first cycle by the charge capacity at the first cycle" (paragraphs [0061] to [0064]). Table 1 in this document indicates that the positive active material of Example 4 includes a surface layer of an amorphous LiNbO compound, the mass ratio of F to Nb is $2866.0 \times 10^{-4}$, and the initial charge-discharge efficiency of a battery produced using the positive active material is 84% (paragraph [0065]).

PRIOR ART DOCUMENTS

Patent Documents

Patent Document 1: JP-A-2017-91913
Patent Document 2: JP-A-2013-37950
Patent Document 3: WO 2019/035418

SUMMARY OF THE INVENTION

Problems to be Solved by the Invention

Even an energy storage device using conventional active material particles whose surfaces are covered with lithium niobium oxide or the like does not have a capacity retention ratio after charge-discharge cycles. An all-solid-state secondary battery is required to have high initial charge-discharge efficiency.

The present invention has been made in view of the above circumstances, and an object of the present invention is to provide a positive active material particle capable of increasing a capacity retention ratio of an energy storage device after charge-discharge cycles, an electrode and an energy storage device using the active material particle, and a method for producing the active material particle. Another object of the present invention is to provide a positive active material which enables production of an all-solid-state secondary battery having high initial charge-discharge efficiency, an electrode for an all-solid-state secondary battery in which the positive active material is used, and an all-solid-state secondary battery using the electrode. Still another object of the present invention is to provide an energy storage apparatus using the above-mentioned energy storage device, or all-solid-state secondary battery.

Means for Solving the Problems

An active material particle according to an aspect of the present invention includes an active material base material (hereinafter, also referred to as a base material) and a covering layer covering at least a part of a surface of the active material base material (hereinafter, also referred to as a surface layer), in which the covering layer contains niobium atoms and phosphorus atoms, and a content of the phosphorus atoms with respect to a total content of the niobium atoms and the phosphorus atoms in the covering layer is more than 0 mol % and 80 mol % or less.

A positive active material for an all-solid-state secondary battery according to another aspect of the present invention includes a base material including a substance capable of storing and releasing lithium ions, and a surface layer which is present on a surface of the base material, contains a lithium element, a niobium element, an oxygen element and a halogen element, and satisfies $0 < c \leq 1.0$ where c is a ratio of a total number of moles of the halogen to a number of moles of the niobium, with the surface layer being crystalline.

An electrode according to another aspect of the present invention contains the active material particle according to an aspect of the present invention or the positive active material for an all-solid-state secondary battery according to an aspect of the present invention.

An energy storage device according to another aspect of the present invention includes the electrode according to an aspect of the present invention.

An all-solid-state secondary battery according to another aspect of the present invention includes the electrode according to an aspect of the present invention.

A method for producing active material particles according to an aspect of the present invention includes, in an order presented, covering at least a part of a surface of a particulate active material base material with a coating agent containing niobium atoms and phosphorus atoms, and heat-treating the active material base material covered with the coating agent, in which a content of the phosphorus atoms with respect to a total content of the niobium atoms and the phosphorus atoms in the coating agent is more than 0 mol % and 80 mol % or less.

An energy storage apparatus according to another aspect of the present invention includes two or more energy storage devices, and one or more energy storage devices according to an aspect of the present invention, and/or all-solid-state secondary batteries according to an aspect of the present invention.

Advantages of the Invention

According to an aspect of the present invention, it is possible to provide a positive active material particle capable of increasing a capacity retention ratio of an energy storage device after charge-discharge cycles, an electrode and an energy storage device using the active material particle, and a method for producing the active material particle, and it is also possible to provide a positive active material which enables production of an all-solid-state secondary battery having high initial charge-discharge efficiency, an electrode for an all-solid-state secondary battery in which the positive active material is used, and an all-solid-state secondary battery using the electrode. Further, it is possible to provide an energy storage apparatus using the above-mentioned energy storage device, or all-solid-state secondary battery.

MODE FOR CARRYING OUT THE INVENTION

Figure 1:
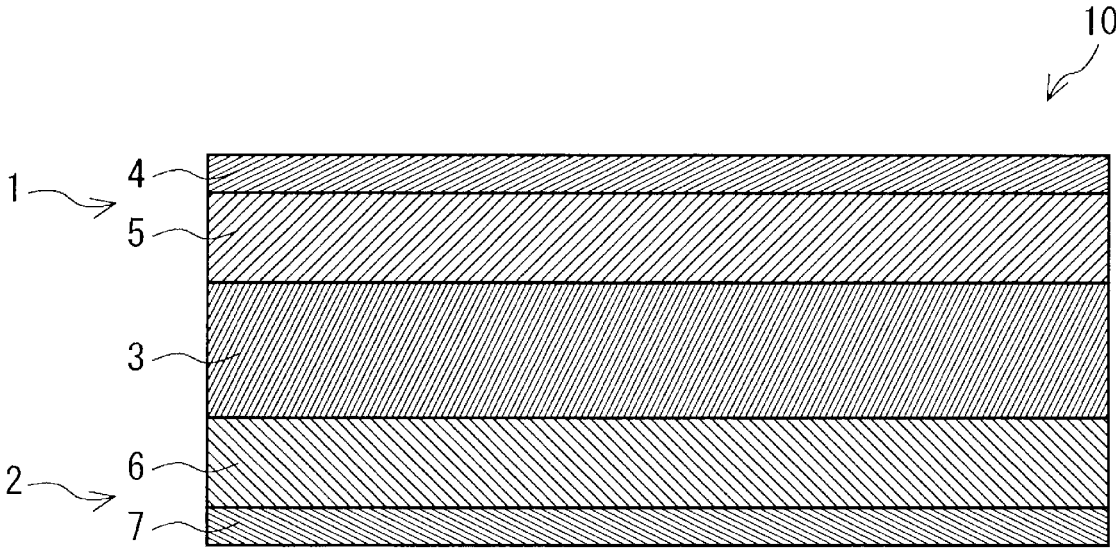
FIG. 1 is a schematic sectional view of an energy storage device (all-solid-state secondary battery) according to an embodiment of the present invention.

First, outlines of an active material particle, an electrode, an energy storage device, an all-solid-state secondary battery, a method for producing active material particles, and an energy storage apparatus, each of which is disclosed in the present specification, will be described.

An active material particle (a) according to an aspect of the present invention includes an active material base material and a covering layer covering at least a part of a surface of the active material base material, in which the covering layer contains niobium atoms and phosphorus atoms, and a content of the phosphorus atoms with respect to a total content of the niobium atoms and the phosphorus atoms in the covering layer is more than 0 mol % and 80 mol % or less.

With the active material particle (a), the capacity retention ratio of the energy storage device after charge-discharge cycles can be increased. The reason why such an effect is produced is not clear, but it is presumed that since the covering layer contains phosphorus atoms in a predetermined ratio together with niobium atoms, the stability of an atomic arrangement structure such as a crystal structure in the covering layer is enhanced, resulting in enhancement of the stability of the covering layer.

It is preferable that the covering layer contains a composite oxide containing the niobium atoms and the phosphorus atoms. In such a case, the stability of the covering layer is further enhanced, so that the capacity retention ratio of the energy storage device after charge-discharge cycles can be further increased.

It is preferable that the composite oxide is represented by the following formula 1.

$$\mathrm{Li}_x\mathrm{Nb}_{(1-y)}\mathrm{P}_y\mathrm{O}_z\mathrm{A}_w \qquad 1$$

In the formula 1, A represents one or more elements other than Li, Nb, P and O. x is a number of more than 0 and 2 or less. y is a number of more than 0 and 0.8 or less. z is a number of 2 or more and 4 or less. w is a number of 0 or more and 1 or less. In such a case, the capacity retention ratio of the energy storage device after charge-discharge cycles can be further increased.

The content of the covering layer with respect to the content of the active material base material is preferably 0.01% by mass or more and 2.0% by mass or less. In such a case, the capacity retention ratio of the energy storage device after charge-discharge cycles can be further increased, and the discharge capacity, the high rate discharge performance and the like of the energy storage device tend to be enhanced.

A positive active material (b) for an all-solid-state secondary battery according to an aspect of the present invention includes a base material including a substance capable of storing and releasing lithium ions, and a surface layer which is present on a surface of the base material, contains a lithium element, a niobium element, an oxygen element and a halogen element, and satisfies $0 < c \leq 1.0$ where c is a ratio of a total number of moles of the halogen to a number of moles of the niobium, with the surface layer being crystalline.

With this positive active material (b) for an all-solid-state secondary battery, an all-solid-state secondary battery having high initial charge-discharge efficiency can be obtained.

Here, in the positive active material (b) for an all-solid-state secondary battery, halogen contained in the surface layer may be at least one selected from bromine and iodine.

In the positive active material (b) for an all-solid-state secondary battery, the surface layer may be one represented by the composition formula of $\mathrm{Li}_a\mathrm{NbO}_b\mathrm{X}_c$ (where X is halogen, and a, b and c are real numbers satisfying $0.5 \leq a \leq 1.5$, $2.5 \leq b \leq 3.5$ and $0 < c \leq 1.0$, respectively).

An electrode according to another aspect of the present invention contains the active material particle (a) according to an aspect of the present invention or the positive active material (b) for an all-solid-state secondary battery according to an aspect of the present invention. Since the electrode contains the active material particle according to an aspect of the present invention, the capacity retention ratio of an energy storage device after charge-discharge cycles can be increased. In other words, with the electrode, an all-solid-state secondary battery having high initial charge-discharge efficiency is obtained.

An energy storage device according to another aspect of the present invention includes the electrode according to an aspect of the present invention. Since the energy storage device includes an electrode containing the active material particle (a) according to an aspect of the present invention, the energy storage device has a capacity retention ratio after charge-discharge cycles.

An all-solid-state secondary battery according to another aspect of the present invention includes the electrode according to an aspect of the present invention. The all-solid-state secondary battery has high initial charge-discharge efficiency.

A method for producing active material particles (a) according to an aspect of the present invention includes, in an order presented, covering at least a part of a surface of a particulate active material base material with a coating agent containing niobium atoms and phosphorus atoms, and heat-treating the active material base material covered with the coating agent, in which a content of the phosphorus atoms with respect to a total content of the niobium atoms and the phosphorus atoms in the coating agent is more than 0 mol % and 80 mol % or less.

The production method enables production of active material particles capable of increasing the capacity retention ratio of the energy storage device after charge-discharge cycles.

An energy storage apparatus according to an aspect of the present invention includes two or more energy storage devices, and one or more of the energy storage devices according to an aspect of the present invention and/or the all-solid-state secondary batteries according to an aspect of the present invention. Since the energy storage apparatus includes the energy storage device according to an aspect of the present invention, the energy storage apparatus has a high capacity retention ratio after charge-discharge cycles. In other words, since the energy storage apparatus includes the all-solid-state secondary battery according to an aspect of the present invention, the energy storage apparatus has high initial charge-discharge efficiency.

Hereinafter, an active material particle, a method for producing the active material particle, an electrode, an energy storage device, an all-solid-state secondary battery, a method for producing the all-solid-state secondary battery, and an energy storage apparatus according to an embodiment of the present invention, and other embodiments will be described in detail. The names of the respective constituent members (respective constituent elements) used in the respective embodiments may be different from the names of the respective constituent members (respective constituent elements) used in the background art.

<Active Material Particle>

An active material particle according to an embodiment of the present invention (hereinafter, also referred to as "the present embodiment") includes an active material base material and a covering layer. The active material particle may be positive active material particle used for a positive electrode or a negative active material particle used for a negative electrode, and is preferably a positive active material particles.

(Active Material Base Material)

The active material base material forms a core of the active material. The active material base material includes an active material. The content of active material in the active material base material may be, for example, 90% by mass or more, 99% by mass or more, or 99.9% by mass or more. The active material base material may have a particle shape or a film shape. When the active material base material has a particle shape, only particles composed of one of the above-described active materials may be used, or two or more kinds of particles including different active materials may be used in mixture. The active material base material may be particles composed substantially only of the active material, or particles composed only of the active material. The active material base material may be primary particles composed of single crystals, or secondary particles formed by aggregation of primary particles. When the active material particle according to an embodiment of the present invention is a positive active material particle, the active material is a positive active material, and when the active material particle according to an embodiment of the present invention is a negative active material particle, the active material is a negative active material.

The positive active material can be appropriately selected from known positive active materials usually used for lithium ion secondary batteries and all-solid-state batteries. As the positive active material, a material capable of storing and releasing lithium ions is usually used. Examples of the positive active material include lithium-transition metal composite oxides that have an $\alpha$-NaFeO$_2$-type crystal structure, lithium-transition metal composite oxides that have a spinel-type crystal structure, polyanion compounds, chalcogenides, and sulfur. Examples of the lithium-transition metal composite oxides that have an $\alpha$-NaFeO$_2$-type crystal structure include Li[Li$_x$Ni$_{(1-x)}$]O$_2$ ($0 \leq x < 0.5$), Li[Li$_x$Ni$_y$Co$_{(1-x-y)}$]O$_2$ ($0 \leq x < 0.5$, $0 < y < 1$), Li[Li$_x$Co$_{(1-x)}$]O$_2$ ($0 \leq x < 0.5$), Li[Li$_x$Ni$_y$Mn$_{(1-x-y)}$]O$_2$ ($0 \leq x < 0.5$, $0 < y < 1$), Li[Li$_x$Ni$_y$Mn$_\beta$Co$_{(1-x-y-\beta)}$]O$_2$ ($0 \leq x < 0.5$, $0 < y$, $0 < \beta$, $0.5 < y + \beta < 1$), and Li[Li$_x$Ni$_y$Co$_\beta$Al$_{(1-x-y-\beta)}$]O$_2$ ($0 \leq x < 0.5$, $0 < y$, $0 < \beta$, $0.5 < y + \beta < 1$). Examples of the lithium-transition metal composite oxides that have a spinel-type crystal structure include Li$_x$Mn$_2$O$_4$ and Li$_x$Ni$_y$Mn$_{(2-y)}$O$_4$. Examples of the polyanion compounds include LiFePO$_4$, LiMnPO$_4$, LiNiPO$_4$, LiCoPO$_4$, Li$_3$V$_2$(PO$_4$)$_3$, Li$_2$MnSiO$_4$, and Li$_2$CoPO$_4$F. Examples of the chalcogenides include titanium disulfide, molybdenum disulfide, and molybdenum dioxide. Some of atoms or polyanions in these materials may be substituted with atoms or anion species composed of other elements. Among these substances, lithium transition metal composite oxides having an $\alpha$-NaFeO$_2$-type crystal structure and lithium transition metal composite oxides having a spinel-type crystal structure are preferable because interface resistance to a surface layer described later.

The positive active material is preferably a lithium transition metal composite oxide, more preferably a lithium transition metal composite oxide containing at least one of nickel, cobalt and manganese, still more preferably a lithium transition metal composite oxide containing at least two of nickel, cobalt and manganese, and even more preferably a lithium transition metal composite oxide containing nickel, cobalt and manganese. The lithium transition metal composite oxide preferably has an $\alpha$-NaFeO$_2$-type crystal structure. By using such a lithium transition metal composite oxide, the energy density can be increased, and the like. Among them, lithium transition metal composite oxides having an $\alpha$-NaFeO$_2$-type crystal structure are more preferable in that an all-solid-state secondary battery having excellent power characteristics are obtained at low cost. Among them, lithium transition metal composite oxides having an $\alpha$-NaFeO$_2$-type crystal structure and containing cobalt are particularly preferable in that an all-solid-state secondary battery having further excellent power characteristics are obtained.

The lithium transition metal composite oxide is preferably a compound represented by the following formula 2.

$$Li_{1+\alpha}Me_{1-\alpha}O_2 \qquad\qquad 2$$

In the formula 2, Me is a metal including at least one of Ni, Co and Mn (excluding Li). The condition of $0 \leq \alpha < 1$ is met.

Me in the formula 2 is preferably composed substantially of three elements of Ni, Co and Mn. However, Me may contain other metals.

From the viewpoint of further increasing electric capacity and the like, a preferred content (composition ratio) of each constituent element in the compound represented by the formula 2 is as follows. The molar ratio is equal to the atomic number ratio.

In the formula 2, the lower limit of the molar ratio (Ni/Me) of Ni to Me is preferably 0.1, and more preferably 0.2, 0.3 or 0.4 in some cases. On the other hand, the upper limit of this molar ratio (Ni/Me) is preferably 0.9, and more preferably 0.8, 0.7 or 0.6 in some cases.

In the formula 2, the lower limit of the molar ratio of Co to Me (Co/Me) is preferably 0.05, and more preferably 0.1 or 0.2 in some cases. On the other hand, the upper limit of the molar ratio (Co/Me) is preferably 0.7, and more preferably 0.5, 0.4 or 0.3 in some cases.

In the formula 2, the lower limit of the molar ratio of Mn to Me (Mn/Me) is preferably 0.05, and more preferably 0.1 or 0.2 in some cases. On the other hand, the upper limit of the molar ratio (Mn/Me) is preferably 0.6, and more preferably 0.5, 0.4 or 0.3 in some cases.

In the formula 2, the upper limit of the molar ratio of Li to Me (Li/Me), i.e. $(1+\alpha)(1-\alpha)$ is preferably 1.6, and more preferably 1.4 or 1.2 in some cases.

A composition ratio of the lithium transition metal composite oxide refers to a composition ratio when a completely discharged state is provided by the following method. First, the energy storage device is subjected to constant current discharge at a current value of 0.05 C to the lower limit voltage in normal use. After the battery is disassembled to take out the positive electrode, a test battery using metal Li as the counter electrode is assembled, constant current discharge is performed at a discharge current of 10 mA per 1 g of a positive active material until the positive potential reaches 3.0 V vs. Li/Li$^+$, and the positive electrode is adjusted to the completely discharged state. The battery is disassembled again, and the positive electrode is taken out. Components (electrolyte and the like) attached on the positive electrode taken out are sufficiently washed off with dimethyl carbonate and is dried at room temperature for 24 hours, and the lithium-transition metal composite oxide of the positive active material is then collected. The collected lithium-transition metal composite oxide is subjected to measurement. The operations of disassembly of the energy storage device through to production of a sample to be measured are performed in an argon atmosphere at a dew point of −60° C. or lower.

Examples of suitable lithium transition metal composite oxides include LiNi$_{1/3}$Co$_{1/3}$Mn$_{1/3}$O$_2$, LiNi$_{3/5}$Co$_{1/5}$Mn$_{1/5}$O$_2$, LiNi$_{1/2}$Co$_{1/5}$Mn$_{3/10}$O$_2$, LiNi$_{1/2}$Co$_{3/10}$Mn$_{1/5}$O$_2$, LiN$_{8/10}$Co$_{1/10}$Mn$_{1/10}$O$_2$.

The negative active material can be appropriately selected from known negative active materials usually used for lithium ion secondary batteries and all-solid-state batteries. As the negative active material, a material capable of storing and releasing lithium ions is usually used. Examples of the negative active material include metal Li; metals or metalloids such as Si and Sn; metal oxides or metalloid oxides such as Si oxide, Ti oxide, and Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, graphite and non-graphitic carbon are preferable.

The term "graphite" refers to a carbon material in which an average grid spacing ($d_{002}$) of a (002) plane determined by X-ray diffraction before charge-discharge or in a discharged state is 0.33 nm or more and less than 0.34 nm. Examples of the graphite include natural graphite and artificial graphite. Artificial graphite is preferable from the viewpoint that a material having stable physical properties can be procured.

The term "non-graphite carbon" refers to a carbon material in which the average grid spacing ($d_{002}$) of a (002) plane determined by X-ray diffraction before charge-discharge or in the discharged state is 0.34 nm or more and 0.42 nm or less. Examples of the non-graphite carbon include hardly graphitizable carbon and easily graphitizable carbon. Examples of the non-graphite carbon include a resin-derived material, a petroleum pitch or a material derived from petroleum pitch, a petroleum coke or a material derived from petroleum coke, a plant-derived material, and an alcohol-derived material.

In this regard, the "discharged state" of the carbon material means a state discharged such that lithium ions that can be stored and released in association with charge-discharge are sufficiently released from the carbon material that is the negative active material. For example, the "discharged state" refers to a state where an open circuit voltage is 0.7 V or more in a monopolar battery in which a negative electrode containing a carbon material as a negative active material is used as a working electrode and metal Li is used as a counter electrode.

The term "hardly graphitizable carbon" refers to a carbon material in which the $d_{002}$ is 0.36 nm or more and 0.42 nm or less.

The term "easily graphitizable carbon" refers to a carbon material in which the $d_{002}$ is 0.34 nm or more and less than 0.36 nm.

The average particle size of the active material base material can be, for example, 0.01 μm or more and 100 μm or less, or 0.01 μm or more and 100 μm or less. The lower limit of the average particle size of the active material base material may be 0.1 μm or 1 μm. The upper limit of the average particle size of the active material base material may be 20 μm or 5 μm. In a case where the negative active material is Si, Sn, an oxide of Si, an oxide of Sn, or the like, the average particle size thereof may be 1 nm or more and 1 μm or less. When the average particle size of the active material base material is equal to or greater than the lower limit, the active material base material is easily produced or handled. When the average particle size of the active material base material is equal to or smaller than the upper limit, a decrease in battery capacity during high rate discharge can be suppressed. In the case where the negative active material is a metal such as metal Li, the active material base material may be in the form of a foil. The "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

A crusher, a classifier, or the like is used to obtain an active material base material with a predetermined particle size. Examples of the crushing method include a method in which a mortar, a ball mill, a sand mill, a vibratory ball mill, a planetary ball mill, a jet mill, a counter jet mill, a whirling airflow type jet mill, a sieve or the like is used. At the time of crushing, wet type crushing in the presence of water or an organic solvent such as hexane can also be used. As a classification method, a sieve, a pneumatic classifier and the like are used both in dry manner and in wet manner if necessary.

(Covering Layer)

The covering layer covers at least a part of the surface of the active material base material. The covering layer covers preferably 50% or more, more preferably 70% or more, still more preferably 90% or more, and even more preferably 95% or more of an area of a surface of the active material base material. With the covering layer sufficiently covering a surface of the active material base material, the capacity retention ratio of the energy storage device after charge-discharge cycles can be increased.

The covering layer of the active material particle (a) according to an embodiment of the present invention contains niobium atoms and phosphorus atoms. The content of phosphorus atoms with respect to the total content of niobium atoms and phosphorus atoms (P/(Nb+P)) in the covering layer is more than 0 mol % and 80 mol % or less. The lower limit of the content of phosphorus atoms with respect to the total content of niobium atoms and phosphorus atoms (P/(Nb+P)) is preferably 1 mol %, more preferably 5 mol %, still more preferably 10 mol %, and even more preferably 15 mol %, 25 mol % or 35 mol % in some cases. When the content of phosphorus atoms is equal to or greater than the lower limit, the capacity retention ratio of the energy storage device after charge-discharge cycles can be further increased. On the other hand, the upper limit of the content of phosphorus atoms with respect to the total content of niobium atoms and phosphorus atoms (P/(Nb+P)) is preferably 60 mol %, and more preferably 40 mol %, 30 mol %, 20 mol % or 15 mol % in some cases. When the content of phosphorus atoms is equal to or smaller than the upper limit, the discharge capacity, the charge-discharge efficiency, the high rate discharge performance and the like of the energy storage device tend to be enhanced.

It is preferable that the covering layer contains oxygen atoms in addition to niobium atoms and phosphorus atoms. The niobium atom and the phosphorus atom are preferably present in the covering layer in the form of a composite oxide containing both the atoms. That is, it is preferable that the covering layer contains a composite oxide containing a niobium atom and a phosphorus atom.

It is preferable that the covering layer further contains lithium atoms. When the covering layer contains lithium atoms, the lithium ion conductivity and the like of the covering layer are improved. It is preferable that the covering layer contains a composite oxide containing a niobium atom, a phosphorus atom and a lithium atom. The covering layer may contain one or more oxides or composite oxides, and may further contain other compounds. The total content of one or more oxides and composite oxides in the covering layer is preferably 50% by mass or more, more preferably 70% by mass or more, still more preferably 90% by mass or more, and even more preferably 99% by mass or more. The covering layer may be a layer of one or more oxides and composite oxides. Examples of compounds other than the one or more oxides and composite oxides, which may be contained in the covering layer, include nitrides, sulfides and halides.

It is preferable that the composite oxide contained in the covering layer is represented by the following formula 1.

$$Li_xNb_{(1-y)}P_yO_zA_w \qquad\qquad 1$$

wherein A represents one or more elements other than Li, Nb, P and O; x is a number of more than 0 and 2 or less; y is a number of more than 0 and 0.8 or less; z is a number of 2 or more and 4 or less; and w is a number of 0 or more and 1 or less.

Examples of A in the formula 1 include typical nonmetal elements such as B, C, N, S, F, Cl, Br and I, typical metal elements such as Na, Mg, Al, K, Ca, Zn, Ga, Ge, Sn, Sr and Ba, and transition metal elements such as Sc, Ti, V, Cr, Mn, Fe, Co, Ni, Cu, Mo, Zr, Ta, Hf and W.

In the formula 1, x is preferably 0.5 or more and 1.5 or less, more preferably 0.8 or more and 1.2 or less, and still more preferably 1. When x is in the above-described range, the lithium ion conductivity and the like of the covering layer are improved.

In the formula 1, the lower limit of y is preferably 0.01, more preferably 0.05, still more preferably 0.1, and even more preferably 0.15, 0.25 or 0.35 in some cases. When y is equal to or greater than the lower limit, the capacity retention ratio of the energy storage device after charge-discharge cycles can be further increased. The upper limit of y is preferably 0.6, and more preferably 0.4, 0.3, 0.2 or 0.15 in some cases. When y is equal to or smaller than the upper limit, the discharge capacity, the charge-discharge efficiency, the high rate discharge performance and the like of the energy storage device tend to be enhanced.

In the formula 1, z is preferably 2.5 or more and 3.5 or less, more preferably 2.8 or more and 3.2 or less, and still more preferably 3. When z is in the above-described range, the structure of the oxide is stabilized, so that the capacity retention ratio of the energy storage device after charge-discharge cycles can be further increased.

In the formula 1, w is preferably 0.5 or less, more preferably 0.2 or less, still more preferably 0.1 or less, and even more preferably 0. When w is equal to or smaller than the upper limit, the stability of the structure of the oxide is enhanced, so that the capacity retention ratio of the energy storage device after charge-discharge cycles can be further increased.

It is preferable that the oxide or composite oxide contained in the covering layer has a crystal structure. In such a case, the stability of the covering layer is enhanced, so that the capacity retention ratio of the energy storage device after charge-discharge cycles can be further increased.

The oxide or composite oxide contained in the covering layer may contain an amorphous part. The oxide contained in the covering layer may be composed only of an amorphous material.

The content of the covering layer with respect to the content of the active material base material is preferably 0.01% by mass or more and 2.0% by mass or less. The lower limit of the content of the covering layer with respect to the content of the active material base material is more preferably 0.1% by mass, still more preferably 0.3% by mass, and even more preferably 0.4% by mass, 0.6% by mass or 0.8% by mass in some cases. When the content of covering layer is equal to or greater than the lower limit, the capacity retention ratio of the energy storage device after charge-discharge cycles tends to increase. The upper limit of the content of the covering layer with respect to the content of the active material base material is preferably 1.6% by mass, and more preferably 1.2% by mass. When the content of covering layer is equal to or smaller than the upper limit, the discharge capacity, the charge-discharge efficiency, the high rate discharge performance and the like of the energy storage device tend to be enhanced.

The average particle size of the active material particles can be, for example, 0.01 μm or more and 100 μm or less. The lower limit of the average particle size of the active material particles may be 0.1 μm or 1 μm. The upper limit of the average particle size of the active material particles may be 20 μm or 5 μm.

A surface layer containing a lithium element, a niobium element, an oxygen element and a halogen element is present on a surface of the base material in the positive active material (b) for an all-solid-state secondary battery according to an embodiment of the present invention. This surface layer satisfies $0 < c \le 1.0$ where c is a ratio of the total number of moles of halogen to the number of moles of niobium.

With this surface layer, an all-solid-state secondary battery having high initial charge-discharge efficiency is obtained. This may be due to the following mechanism of action. In the all-solid-state secondary battery, the positive active material and the solid electrolyte are in contact with each other as described above. Here, when the positive active material includes a surface layer, the surface layer comes into contact with the solid electrolyte on a solid-to-solid basis. If charge-discharge is performed in this state, a substitution reaction may occur between a component of the surface layer and a component of the solid electrolyte. An irreversible capacity generated by this substitution reaction leads to a decrease in initial charge-discharge efficiency. However, if the surface layer contains a lithium element, a niobium element, an oxygen element and a halogen element, and is crystalline, the substitution reaction may be unlikely to occurs because a crystalline form is more structurally stable than an amorphous form. As a result, the irreversible capacity may be reduced, leading to enhancement of initial charge-discharge efficiency.

The action of enhancing the initial charge-discharge efficiency by the surface layer is significant when an all-solid-state secondary battery is formed by combining a sulfide solid electrolyte described later and a positive active material including a base material containing oxygen as a constituent element. It is known that in such an all-solid-state secondary battery, a substitution reaction between oxygen in the positive active material and sulfur in the solid electrolyte easily occurs. Thus, by providing a surface layer which contains a lithium element, a niobium element, an oxygen element and a halogen element and is crystalline, the surface layer at an interface with the solid electrolyte is structurally stabilized, so that a substitution reaction is significantly suppressed, leading to considerable enhancement of charge-discharge efficiency. The action of enhancing the initial charge-discharge efficiency is significant in a combination of a sulfide solid electrolyte and a base material including a lithium transition metal composite oxide, more significant in a combination of a sulfide solid electrolyte and a base material including a lithium transition metal composite oxide having an $\alpha$-$NaFeO_2$-type crystal structure, and still more significant in a combination of a sulfide solid electrolyte and a base material including a lithium transition metal composite oxide containing cobalt as a transition metal element and having an $\alpha$-$NaFeO_2$-type crystal structure.

Here, whether the covering layer or the surface layer is crystalline is confirmed by the following procedure. A thin sample containing an active material is provided, and observed with a transmission electron microscope (TEM). The electron diffraction of the covering layer or the surface layer of the active material is acquired, and whether a diffraction spot is present is confirmed. When the diffraction spot can be observed, it is determined that the covering layer or the surface layer is crystalline.

In the case where the active material to be measured is collected by disassembling the energy storage device or the all-solid-state secondary battery for providing the thin sample, the thin sample is provided by the following method. The energy storage device or the all-solid-state secondary battery is subjected to constant current discharged at a constant current of 0.05 C to a lower limit voltage in normal use in an environment at 25° C. Subsequently, the energy storage device and the all-solid-state secondary battery is disassembled to take out the electrode assembly.

Subsequently, fragments including the active material are collected from the electrode assembly taken out. Subsequently, a portion of the collected fragments, which includes the active material, is processed into a thin sample by a focused ion beam apparatus (FIB), and observed by TEM.

However, in the case where the active material is produced by a method in which a coating agent containing niobium atoms and phosphorus atoms or a solution containing a lithium element, a titanium element and a halogen element is applied to the base material, and heating is performed, the production conditions are known, and raw materials for producing the active material can be obtained, it may be determined that the covering layer or the surface layer is crystalline by the following procedure. First, a solution prepared in the same procedure as that for the coating agent or the solution applied to the base material is heated under the same conditions as those in the production of the active material to obtain sample powder. Subsequently, the obtained sample powder is subjected to X-ray diffraction measurement. When a peak derived from the crystal structure is observed in the obtained X-ray diffraction diagram, it is determined that the covering layer or the surface layer is crystalline.

The X-ray diffraction measurement is performed by the following procedure. First, an X-ray diffraction measurement sample holder is filled with sample powder. Powder X-ray diffraction measurement is performed using an X-ray diffractometer ("MiniFlex II" from Rigaku Corporation). A CuKα ray is used as a radiation source, a tube voltage is 30 kV, and a tube current is 15 mA. The diffracted X-ray passes through a KB filter having a thickness of 30 μm and is detected by a high-speed one-dimensional detector (model number: D/teX Ultra 2). A sampling width is 0.01°, a scanning speed is 5°/min, a divergence slit width is 0.625°, a light receiving slit width is 13 mm (OPEN), and a scattering slit width is 8 mm.

The ratio of the total number of moles of halogen to the number of moles of niobium in the surface layer, that is, the value of c is 1.0 or less. When the value of c is equal to or smaller than the upper limit, oxygen in the surface layer can be brought into a stable state. From the viewpoint of further improving the stability of oxygen in the surface layer, the value of c is preferably 0.8 or less, more preferably 0.5 or less, and still more preferably 0.3 or less. On the other hand, from the viewpoint of optimizing the action of suppressing the substitution reaction between oxygen in the surface layer and a component in the solid electrolyte, the value of c is preferably 0.01 or more, more preferably 0.05 or more, and still more preferably 0.1 or more. For these reasons, the value of c is preferably 0.01 or more and 0.8 or less, more preferably 0.05 or more and 0.5 or less, and still more preferably 0.1 or more and 0.3 or less.

The surface layer is preferably one represented by the composition formula of $Li_aNbO_bX_c$ (where X is halogen, and a, b and c are real numbers satisfying $0.5 \leq a \leq 1.5$, $2.5 \leq b \leq 3.5$ and $0 < c \leq 1.0$, respectively).

Here, the composition formula of the surface layer is determined by the following procedure. For the positive active material, quantitative analysis of elements is performed with an inductively coupled plasma atomic emission spectroscopy (ICP-AES) analysis apparatus or an X-ray photoelectron spectroscopy (XPS) analysis apparatus to identify the constituent elements and composition of the positive active material. Here, the contents of elements quantifiable by ICP-AES are determined on the basis of the results of the ICP-AES measurement. In the ICP-AES analysis, a positive active material fully dissolved in an acidic solution by a microwave decomposition method is used as an analysis sample. Subsequently, the crystal structure of the surface layer is identified by TEM observation of the surface layer. If the surface layer is amorphous, the crystal structure of the surface layer is identified after the positive active material is heat-treated so that the surface layer is crystallized. The composition formula of the surface layer is presumed from the obtained information, and the presumed composition formula is taken as the composition formula of the surface layer. In the case where a positive electrode active material to be quantitatively analyzed is collected by disassembling the all-solid-state secondary battery, the positive active material is provided by the following method. First, the all-solid-state secondary battery is subjected to constant current discharge at a current value of 0.05 C to the lower limit voltage in normal use. Subsequently, the all-solid-state secondary battery is disassembled to take out the electrode assembly. The surfaces of the electrode assembly and the electrode are observed, and when it is confirmed that the positive active material layer contains a particulate positive active material and the electrode assembly taken out contains a solid electrolyte, the solid electrolyte is removed by immersing the electrode assembly in a solvent in which only the solid electrolyte is dissolved, such as ethanol or ion-exchange water. Subsequently, the binder is removed by immersing the positive active material layer in a solvent in which only the binder is dissolved, such as butyl butylate, and the conductive agent and the positive active material are taken out. Subsequently, the conductive agent and the positive electrode active material are separated by performing decantation using ion-exchange water or the like as a solvent. The obtained positive active material is used as a measurement sample. The surface of the electrode is observed, and when the positive active material layer is confirmed to contain a film-shaped positive active material, the electrode is used directly, or cut to an appropriate size and used a measurement sample. For a sample to be analyzed by XPS, a surface on which the positive active material layer is formed is defined as a measurement surface.

The halogen contained in the surface layer is preferably at least one selected from bromine and iodine. When the halogen is as described above, an all-solid-state secondary battery having higher initial charge-discharge efficiency is obtained. This may be because when the halogen is contained, the surface layer is structurally more stable, so that the substitution reaction with a component of the solid electrolyte in charge-discharge of the all-solid-state secondary battery is further suppressed.

The amount of the surface layer is preferably 0.05% by mass or more, and more preferably 0.10% by mass or more with respect to the base material. When the amount of the surface layer is equal to or greater than the lower limit, the chemical or electrochemical stability of the positive active material can be improved to suppress an unintended reaction. On the other hand, the amount of the surface layer is preferably 0.70% by mass or less, and more preferably 0.65% by mass or less with respect to the base material. When the amount of the surface layer is equal to or smaller than the upper limit, it is possible to suppress a decrease in battery capacity in high rate discharge in the resulting all-solid-state secondary battery. For these reasons, the amount of the surface layer is preferably 0.05% by mass or more and 0.70% by mass or less, and more preferably 0.10% by mass or more and 0.65% by mass or less with respect to the base material.

It is preferable that in the positive active material (b) for an all-solid-state secondary battery according to the present embodiment, the surface layer is present so as to cover the entire surface of the base material. However, even if there is a portion where the base material is exposed, the positive active material (b) for an all-solid-state secondary battery exhibits the above-described action when the ratio of the area of the exposed portion to the total surface area of the base material is relatively small, and the exposed portion is not concentrated in a specific region of the base material. As described above, in the case where two or more kinds of base material particles including different substances are used in mixture, at least one kind of base material particles may have a surface layer.

In the case where the base material has a particle shape, the average particle size of the positive active material (b) for an all-solid-state secondary battery which is formed by the base material and the surface layer is, for example, preferably 0.1 μm or more and 20 μm or less. When the average particle size of the positive active material (b) is equal to or greater the lower limit, the positive active material is easily manufactured or handled. When the average particle size of the positive active material (b) is equal to or smaller than the upper limit, a decrease in battery capacity during high rate discharge can be suppressed. It is to be noted that in the case of using a composite of the positive active material (b) and another material, the average particle size of the composite is regarded as the average particle size of the positive active material.

For obtaining the positive active material (b) with a predetermined particle size, the particle size of the base material may be adjusted using a crusher, a classifier or the like. As the crushing method and the classification method, the methods exemplified above are used.

(Application)

The active material particle (a) can be used for various energy storage devices, and can be suitably used for energy storage devices in a solid electrolyte is used, in particular, all-solid energy storage devices. When the active material particle (a) is used for an energy storage device in which a solid electrolyte is used, a good interface is formed between the active material particle and the solid electrolyte, and the effect of increasing the capacity retention ratio after charge-discharge cycles is particularly sufficiently exhibited. The active material particle (a) can also be applied to energy storage devices in which a solid electrolyte and an electrolyte solution are used in combination as an electrolyte, energy storage devices in which only an electrolyte solution is used as an electrolyte, and the like.

(Method for Producing Active Material Particles)

A method for producing active material particles (a) according to an embodiment of the present invention includes, in an order presented, (1) covering at least a part of a surface of a particulate active material base material with a coating agent containing niobium atoms and phosphorus atoms, and (2) heat-treating the active material base material covered with the coating agent.

The positive active material (b) according to the present embodiment can be suitably produced by a method in which a solution containing a lithium element, a niobium element and a halogen element is applied to the base material, and heating is then performed.

(1) Covering Step

As the particulate active material base material used in this step, a heretofore known active material can be used. The particulate base material can be produced by mixing powdered raw materials at a predetermined ratio and firing the obtained mixture. The powdered raw materials used here may be obtained by a coprecipitation method. The film-shaped base material can be produced by, for example, sputtering using a target having a predetermined composition. Specific examples and suitable examples of the active material base material are the same as the above-described examples of the active material base material of the active material particles according to an embodiment of the present invention.

The coating agent used in the method for producing active material particles (a) contains niobium atoms and phosphorus atoms. The coating agent may be, for example, a solution including a solute and a solvent. The niobium atoms and phosphorus atoms are normally contained in the solute component of the coating agent. The content of phosphorus atoms with respect to the total content of niobium atoms and phosphorus atoms in the coating agent is more than 0 mol % and 80 mol % or less. The suitable range of the content of phosphorus atoms with respect to the total content of niobium atoms and phosphorus atoms in the coating agent is the same as that of the content of phosphorus atoms with respect to the total content of niobium atoms and phosphorus atoms in the above-described covering layer.

It is preferable that the coating agent further contains lithium atoms in the solute component. The coating agent can be prepared by, for example, dissolving a niobium-containing compound, a phosphorus-containing compound and a lithium-containing compound as solutes in a solvent. A compound containing two or more of the lithium atom, the phosphorus atom and the lithium atom may be used as the solute. Examples of the niobium-containing compound include niobium alkoxides such as niobium (V) ethoxide and niobium (V) methoxide, niobium acetate, and niobium hydroxide. Examples of the phosphorus-containing compound include phosphoric acid and phosphoric acid esters. Examples of the lithium-containing compound include lithium alkoxides such as lithium ethoxide and lithium methoxide, lithium acetate, and lithium hydroxide. The mixing ratio of the components is appropriately set according to a desired covering layer or composition of an oxide or a composite oxide forming the covering layer. The solvent used for the coating agent is not particularly limited as long as it is a solvent in which the niobium-containing compound, the phosphorus-containing and the lithium-containing compound can be dissolved, and for example, ethanol can be used.

The solution applied to the base material used in the method for producing the positive active material (b) can be prepared by, for example, dissolving a niobium-containing compound, a halogen-containing compound and a lithium-containing compound in a solvent. A compound containing two or more elements of niobium, halogen and lithium may be used. Examples of the niobium-containing compound include niobium alkoxides such as niobium (V) ethoxide and niobium (V) methoxide, niobium acetate, and niobium hydroxide. Examples of the halogen-containing compound include niobium halides and lithium halides. Examples of the lithium-containing compound include lithium alkoxides such as lithium ethoxide and lithium methoxide, lithium acetate, and lithium hydroxide. The mixing ratio of the components is appropriately set according to a desired composition of the surface layer. The solvent used for the solution is not particularly limited as long as it is a solvent in which the niobium-containing compound, the halogen-containing and the lithium-containing compound can be dissolved, and for example, ethanol can be used.

A surface of the active material base material can be covered with the coating agent or the solution by, for example, a heretofore known coating method such as spin coating, dip coating or rolling fluidized coating. Among these method, rolling fluidized coating is preferable because a covering layer having high homogeneity is easily obtained. The rolling fluidized coating is a coating method in which an active material base material is brought into a rolling fluidized state, and a coating agent or a solution is sprayed to the active material base material in the rolling fluidized state, and dried (to remove the solvent). The temperature of the inside of a rolling fluidized coating apparatus when rolling fluidized coating is performed can be, for example, 60° C. or higher and 120° C. or lower. Depending on a covering method, a step of drying the coating agent or the solution (step of removing the solvent) may be provided separately from the step of covering the base material with the coating agent or the solution. In the case where the base material has a film shape, spin coating, bar coating, spray coating or the like can be suitably used.

The covering step by rolling fluidized coating or the like may be carried out in an atmosphere of an inert gas such as nitrogen or argon, or in an air atmosphere. The amount (coating amount) of the coating agent or the solution used for the covering can be appropriately adjusted according to an amount of the covering layer formed.

(2) Heat Treatment Step

In the present step, the active material base material covered with the coating agent or the solution is heat-treated. In a state before the heat treatment is performed, the coating agent or the solution may be present on the surface of the active material base material in a dry state (a state after the solvent is removed, or a state in which there is only a solute). In the heat treatment step, the coating agent or the solution may be dried (to remove the solvent). By passing through this heat treatment, the active material particle (a) on which the covering layer containing niobium atoms, phosphorus atoms and optional other atoms is formed or the positive active material (b) including a surface layer which contains a lithium element, a niobium element, an oxygen element and a halogen element and is crystalline is obtained.

The heat treatment is performed preferably in an atmosphere containing oxygen, and may be performed in, for example, an air atmosphere. The heating temperature range is, for example, preferably 250° C. or higher and 550° C. or lower, more preferably 300° C. or higher and 500° C. or lower, and still more preferably 350° C. or higher and 450° C. or lower. The heat treatment time is preferably 1 minute or more and 10 hours or less, more preferably 10 minutes or more and 4 hours or less, and still more preferably 15 minutes or more and 2 hours or less.

In the method for producing the positive active material (b), it may be preferable that the heating of the base material with the solution is performed at a temperature of 300° C. or higher and 600° C. or lower in an air atmosphere for 10 minutes or more and 1 hour or less. Consequently, the elements contained in the solution react with each other to form a surface layer. It is presumed that here, the halogen contained in the solution contributes to formation of a regular arrangement of atoms or ions, so that the surface layer becomes crystalline. It may be preferable that the halogen is at least one selected from bromine and iodine from the viewpoint that the surface layer is structurally more stable, so that the substitution reaction with a component of the solid electrolyte in charge-discharge of the all-solid-state secondary battery is more easily suppressed.

<Electrode>

An electrode according to an embodiment of the present invention contains the active material particle (a) according to an embodiment of the present invention or the positive active material (b) for an all-solid-state secondary battery according to an aspect of the present invention. The electrode includes a substrate and an active material layer disposed directly on the negative substrate or over the substrate with an intermediate layer interposed therebetween. The electrode may be a positive electrode or a negative electrode, but is preferably a positive electrode.

(Substrate)

The substrate has conductivity. Whether the positive electrode substrate has "conductivity" is determined by the volume resistivity of $10^7$ Ω·cm measured in conformity with JIS-H-0505 (1975) as a threshold.

As the material of the substrate (positive electrode substrate) in the case where the electrode is a positive electrode, a metal such as aluminum, titanium, tantalum, or stainless steel, or an alloy thereof is used. Among these, aluminum or an aluminum alloy is preferable from the viewpoint of electric potential resistance, high conductivity, and costs. Examples of the positive electrode substrate include a foil, a deposited film, a mesh, and a porous material, and a foil is preferable from the viewpoint of cost. Accordingly, the positive electrode substrate is preferably an aluminum foil or an aluminum alloy foil. Examples of the aluminum or aluminum alloy include A1085, A3003, and A1N30 specified in JIS-H-4000 (2014) or JIS-H-4160 (2006).

The average thickness of the positive electrode substrate is preferably 3 μm or more and 50 μm or less, more preferably 5 μm or more and 40 μm or less, still more preferably 8 μm or more and 30 μm or less, particularly preferably 10 μm or more and 25 μm or less. When the average thickness of the positive electrode substrate is within the above-described range, it is possible to increase the energy density per volume of the energy storage device while increasing the strength of the positive electrode substrate. The "average thickness" of the positive electrode substrate and the negative electrode substrate described below refers to a value obtained by dividing a cutout mass in cutout of a substrate that has a predetermined area by a true density and a cutout area of the substrate.

As the material of the substrate (negative electrode substrate) in the case where the electrode is a negative electrode, a metal such as copper, nickel, stainless steel, nickel-plated steel, or aluminum, an alloy thereof, a carbonaceous material, or the like is used. Among these metals and alloys, copper or a copper alloy is preferable. Examples of the negative electrode substrate include a foil, a deposited film, a mesh, and a porous material, and a foil is preferable from the viewpoint of cost. Accordingly, the negative electrode substrate is preferably a copper foil or a copper alloy foil. Examples of the copper foil include a rolled copper foil and an electrolytic copper foil.

The average thickness of the negative electrode substrate is preferably 2 μm or more and 35 μm or less, more preferably 3 μm or more and 30 μm or less, still more preferably 4 μm or more and 25 μm or less, particularly preferably 5 μm or more and 20 μm or less. When the average thickness of the negative electrode substrate falls within the above-described range, it is possible to increase the energy density per volume of the energy storage device while increasing the strength of the negative electrode substrate.

(Intermediate Layer)

The intermediate layer is a layer arranged between the substrate and the active material layer. The intermediate layer contains a conductive agent such as carbon particles to reduce contact resistance between the substrate and the active material layer. The configuration of the intermediate layer is not particularly limited, and includes, for example, a binder and a conductive agent.

(Active Material Layer)

The active material layer contains the active material particle according to an embodiment of the present invention. The positive active material layer contains optional components such as a solid electrolyte, a conductive agent, a binder (binding material), a thickener and a filler as necessary. The active material layer may be formed from a composite (positive composite or negative composite) containing active material particles and the like.

In the active material layer (positive active material layer) when the electrode is a positive electrode, positive active material particles are used as active material particles. In the active material layer (negative active material layer) when the electrode is a negative electrode, negative active material particles are used as active material particles. The content of the active particles in the active material layer is preferably 30% by mass or more and 99% by mass or less, more preferably 50% by mass or more and 98% by mass or less, still more preferably 60% by mass or more and 95% by mass or less, and even more preferably 70% by mass or more, 80% by mass or more or 90% by mass or more in some cases. When the content of the active material particles is in the above-described range, it is possible to achieve both high energy density and productivity of the energy storage device.

As the solid electrolyte, a heretofore known solid electrolyte can be used. Examples of the solid electrolyte include sulfide-based solid electrolytes, oxide-based solid electrolytes, oxynitride solid electrolytes, dry polymer electrolytes, gel polymer electrolytes, and pseudo solid electrolytes, and the sulfide-based solid electrolytes are preferable.

Examples of the sulfide-based solid electrolyte include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$P_2S_5$—$Li_3N$, $Li_2S$—$SiS_2$, $Li_2S$—$SiS_2$—$LiI$, $Li_2SSiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_{2n}$ (where m and n are positive numbers, and Z is any of Ge, Zn, and Ga), $Li_2S$—$GeS_2$, $Li_2S$—$SiS_2$—$Li_3PO_4$, $Li_2S$—$SiS_2$-$Li_xMO_y$ (where that x and y are positive numbers, and M is any of P, Si, Ge, B, Al, Ga, and In), and $Li_{10}GeP_2S_{12}$. The solid electrolyte contained in the active material layer may be identical to or different from that contained in a isolation layer described later.

When the active material layer contains a solid electrolyte, the content of the solid electrolyte in the active material layer is preferably 10% by mass or more and 90% by mass or less, more preferably 20% by mass or more and 70% by mass or less, and still more preferably 25% by mass or more and 50% by mass or less in some cases. When the content of the solid electrolyte is in the above-described range, the electric capacity of the energy storage device can be increased. When the electrode according to an embodiment of the present invention is applied to a nonaqueous electrolyte solution energy storage device, the active material layer may be free of a solid electrolyte.

In the active material layer, the active material particles and the solid electrolyte may form a composite. Examples of the composite of the positive active material particles and the solid electrolyte include composites having a chemical or physical bond between positive active material particles and a solid electrolyte or the like, and composites obtained by mechanically combining positive active material particles and a solid electrolyte or the like. The composite has active material particles, a solid electrolyte and the like in one particle, and examples thereof include those in which active material particles, a solid electrolyte and the like form an aggregated state, and those in which a film containing a solid electrolyte or the like is formed on at least a part of a surface of an active material particle.

The conductive agent is not particularly limited as long as it is a material exhibiting electrical conductivity. Examples of such a conductive agent include carbonaceous materials, metals, and conductive ceramics. Examples of the carbonaceous materials include graphite, non-graphitic carbon, and graphene-based carbon. Examples of the non-graphite carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly, or two or more thereof may be used in mixture. These materials may be composited and used. For example, a material obtained by compositing carbon black with CNT may be used. Among these materials, carbon black is preferable from the viewpoint of electron conductivity, and in particular, acetylene black is preferable.

The content of the conductive agent in the active material layer is preferably 1% by mass or more and 10% by mass or less, and more preferably 3% by mass or more and 9% by mass or less. When the content of the conductive agent is in the above-described range, the energy density of the energy storage device can be increased.

Examples of the binder include: thermoplastic resins such as fluororesin (polytetrafluoroethylene (PTFE), polyvinylidene fluoride (PVDF), etc.), polyethylene, polypropylene, polyacryl, and polyimide; elastomers such as an ethylene-propylene-diene rubber (EPDM), sulfonated EPDM, a styrene butadiene rubber (SBR), and a fluororubber; and polysaccharide polymers.

The content of the binder in the active material layer is preferably 1% by mass or more and 10% by mass or less, more preferably 3% by mass or more and 9% by mass or less. When the content of the binder is in the above-described range, the active material particles can be stably held.

Examples of the thickener include polysaccharide polymers such as carboxymethylcellulose (CMC) and methylcellulose. In a case where the thickener has a functional group that is reactive with lithium and the like, the functional group may be deactivated by methylation or the like in advance.

The filler is not particularly limited. Examples of the filler include polyolefins such as polypropylene and polyethylene, inorganic oxides such as silicon dioxide, alumina, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, and barium sulfate, nitrides such as aluminum nitride and silicon nitride, and substances derived from mineral resources, such as talc, montmorillonite, boehmite, zeolite, apatite, kaolin, mullite, spinel, olivine, sericite, bentonite and mica, or artificial products thereof.

The active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Nb, or W as a component other than the active material particle, the solid electrolyte, the conductive agent, the binder, the thickener, and the filler.

An average thickness of the active material layer is preferably 10 μm or more and 1,000 μm or less, and more preferably 30 μm or more and 500 μm or less. When the average thickness of the active material layer is equal to or greater than the lower limit, an energy storage device having a high energy density can be obtained. When the average thickness of the active material layer is equal to or smaller than the upper limit, the size of the energy storage device can be reduced. The average thickness of the active material layer is regarded as an average value of thicknesses measured at any five points. The same applies to the average thickness of the isolation layer described later.

<Energy Storage Device>

The energy storage device according to an embodiment of the present invention will be described below by showing an all-solid-state battery (hereinafter, also referred to as an all-solid-state secondary battery or simply as a secondary battery) as a specific example. The all-solid-state secondary battery according to an embodiment of the present invention includes an electrode assembly including a positive electrode, a negative electrode and an isolation layer, and a case which houses the electrode assembly. The isolation layer includes a solid electrolyte. Normally, the electrode assembly is of layered type in which a plurality of positive electrodes and a plurality of negative electrodes are stacked with isolation layers interposed between the positive electrodes and the negative electrodes, respectively. In addition, the electrode assembly may be of so-called "bipolar type" in which a positive active material layer is formed on one surface of the substrate and a negative active material layer is formed on the other surface of the substrate. An energy storage device 10 of FIG. 1 is an all-solid-state secondary battery, and is a secondary battery in which a positive electrode 1 and a negative electrode 2 are arranged with an isolation layer 3 interposed therebetween. The positive electrode 1 includes a positive electrode substrate 4 and a positive active material layer 5, and the positive electrode substrate 4 is an outermost layer of the positive electrode 1. The negative electrode 2 includes a negative electrode substrate 7 and a negative active material layer 6, and the negative electrode substrate 7 is an outermost layer of the negative electrode 2. In the energy storage device 10 shown in FIG. 1, the negative active material layer 6, the isolation layer 3, the positive active material layer 5, and the positive electrode substrate 4 are stacked in this order on the negative electrode substrate 7. At least one of the positive electrode 1 and the negative electrode 2 in the energy storage device 10 is an electrode according to an embodiment of the present invention.

(Positive Electrode)

The positive electrode 1 includes a positive electrode substrate 4 and a positive active material layer 5 disposed directly on the positive electrode substrate 4 or over the positive electrode substrate with an intermediate layer interposed therebetween. In an embodiment of the present invention, when the electrode according to an embodiment of the present invention is used as the positive electrode 1, the specific forms and suitable forms of the positive electrode substrate 4 and the positive active material layer 5 of the positive electrode 1 are as described above as the substrate (positive electrode substrate) and the active material layer (positive active material layer) provided in the electrode according to an embodiment of the present invention.

As another embodiment of the present invention, when the electrode according to an embodiment of the present invention is used as the negative electrode 2, the positive electrode 1 may be a heretofore known positive electrode. Examples of the positive electrode 1 include positive electrodes that are the same as the electrode (positive electrode) according to an embodiment of the present invention except that heretofore known positive active material particles are used as active material particles.

The positive electrode may have not only the above-described configuration, but also a configuration in which a current collection tab is bonded to a positive composite pellet containing a positive active material, and a conductive agent, a binder, a thickener, a filler, a solid electrolyte and the like as optional components, or a configuration in which a current collector including conductive fibers or a foamed current collector is impregnated with a positive composite.

(Negative Electrode)

The negative electrode 2 has a negative electrode substrate 7 and a negative active material layer 6 disposed on the negative electrode substrate 7 directly or with an intermediate layer interposed therebetween. In an embodiment of the present invention, when the electrode according to an embodiment of the present invention is used as the negative electrode 2, the specific forms and suitable forms of the negative electrode substrate 7 and the negative active material layer 6 of the negative electrode 2 are as described above as the substrate (negative electrode substrate) and the active material layer (negative active material layer) provided in the electrode according to an embodiment of the present invention.

The negative active material is typically particles (powder). The average particle size of the negative active material can be, for example, 1 nm or more and 100 μm or less. In a case where the negative active material is a carbon material, a titanium-containing oxide, or a polyphosphoric acid compound, the average particle size thereof may be 1 μm or more and 100 μm or less. In a case where the negative active material is Si, Sn, an oxide of Si, an oxide of Sn, or the like, the average particle size thereof may be 1 nm or more and 1 μm or less. By setting the average particle size of the negative active material to be equal to or more than the lower limit, the negative active material is easily produced or handled. When the average particle size of the negative active material is equal to or smaller than the upper limit, a decrease in battery capacity during high rate discharge can be suppressed. A crusher, a classifier and the like are used to obtain a powder having a predetermined particle size. A crushing method and a powder classification method can be selected from, for example, the methods exemplified for the active material particle. In a case where the negative active material is a metal such as metal Li, the negative active material may be in the form of a foil.

As another embodiment of the present invention, when the electrode according to an embodiment of the present invention is used as the positive electrode 1, the negative electrode 2 may be a heretofore known negative electrode. Examples of the negative electrode 2 include negative electrodes that are the same as the electrode (negative electrode) according to an embodiment of the present invention except that heretofore known negative active material particles are used as active material particles. In another embodiment, the negative active material layer 6 may be a layer composed substantially of only metal lithium. In this case, the content of lithium in the negative active material layer 6 may be 90% by mass or more, may be 99% by mass or more, or may be 100% by mass. The negative active material layer 6 may be a metal lithium foil or a lithium alloy foil.

(Isolation Layer)

The isolation layer 3 normally contains a solid electrolyte. As the solid electrolyte contained in the isolation layer 3, the heretofore known solid electrolyte described above can be used, and examples of the solid electrolyte include a sulfide solid electrolyte, an oxide solid electrolyte, an oxynitride solid electrolyte, and a polymer solid electrolyte. Among them, a sulfide-based solid electrolyte is preferable from the viewpoint that an interface between the positive active material and the negative active material is easily formed because ionic conductivity is high and plastic strain easily occurs. The sulfide solid electrolyte is a solid electrolyte containing sulfur as a constituent element, and examples thereof include $Li_2S$—$P_2S_5$, $LiI$—$Li_2SP_2S_5$, $Li_{10}Ge$—$P_2S_{12}$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$P_2S_5$—$Li_3N$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_{2n}$ (provided that m and n are positive numbers, and Z is any of Ge, Zn, and Ga), $Li_2S$—$GeS_2$, $Li_2S$—$SiS_2$—$Li_3PO_4$, and $Li_2S$—$SiS_2$-$Li_xMO_y$ (where x and y are positive numbers, and M is any of P, Si, Ge, B, Al, Ga, and In). The content of the solid electrolyte in the isolation layer 3 is preferably 70% by mass or more, more preferably 90 by mass or more %, still more preferably 99% by mass or more, and even more preferably substantially 100% by mass in some cases.

The isolation layer 3 may contain, in addition to a solid electrolyte, optional components such as a phosphoric acid compound such as $Li_3PO_4$, an oxide, a halogen compound, a binder, a thickener and a filler. The optional components such as a binder, a thickener and a filler can be selected from the materials exemplified as the components in the active material layer.

The average thickness of the isolation layer 3 is preferably 1 μm or more and 200 μm or less, and more preferably 3 μm or more and 100 μm or less. The average thickness of the isolation layer is preferably 1 μm or more and 50 μm or less, and more preferably 3 μm or more and 20 μm or less. When the average thickness of the isolation layer 3 is equal to or greater than the lower limit, the positive electrode 1 and the negative electrode 2 can be insulated with high reliability. When the average thickness of the isolation layer 3 is equal to or smaller than the upper limit, the energy density of the energy storage device 10 can be increased.

<Method for Producing Energy Storage Device>

The energy storage device according to an embodiment of the present invention can be produced by a heretofore known method. In the case of the energy storage device 10 which is the above-described all-solid-state battery, for example, the method includes: (1) providing a positive composite by mixing a positive active material and a solid electrolyte for a positive active material layer; (2) providing a material for an isolation layer; (3) providing a negative composite by mixing a negative active material and a solid electrolyte for a negative active material layer; and (4) stacking a positive electrode, an isolation layer and a negative electrode.

(1) Step of Providing Positive Composite

In this step, a positive composite for forming a positive active material layer is usually produced. A method of producing the positive composite is not particularly limited, and can be appropriately selected according to the purpose. Examples thereof include a mechanical milling treatment of a material of the positive composite, and compression molding of a material of the positive composite. When the positive composite contains a mixture or a composite containing positive active material particles and a solid electrolyte, this step can include mixing the positive active material particles and the solid electrolyte using, for example, a mechanical milling method or the like to produce a mixture or a composite of the positive active material particles and the solid electrolyte.

(2) Step of Providing Material for Isolation Layer

In the present step, normally, a material for an isolation layer for forming the isolation layer is produced. The material for an isolation layer can be normally a solid electrolyte. The solid electrolyte as the material for an isolation layer can be produced by a heretofore known method. For example, predetermined materials can be obtained by a mechanical milling method. The material for the isolation layer may be produced by heating predetermined materials to a melting temperature or higher by a melt quenching method to melt and mix the materials at a predetermined ratio, and quenching the mixture. Examples of other methods of synthesizing the material for the isolation layer include a solid phase method of sealing under reduced pressure and firing, a liquid phase method such as dissolution precipitation, a gas phase method (PLD), and firing under an argon atmosphere after mechanical milling.

(3) Step of Providing Negative Composite

In the present step, normally, a negative composite for forming a negative active material layer is produced. A specific method of producing the negative composite is the same as that for the positive composite.

(4) Stacking Step

In the present step, for example, a positive electrode including a positive electrode substrate and a positive active material layer, an isolation layer, and a negative electrode including a negative electrode substrate and a negative active material layer are stacked. In this step, the positive electrode, the isolation layer and the negative electrode may be sequentially formed in this order, or vice versa, and the order of formation of each layer is not particularly limited. The positive electrode is formed, for example, by pressure-molding a positive electrode substrate and a positive composite, the isolation layer is formed by pressure-molding the material for the isolation layer, and the negative electrode is formed by pressure-molding a negative electrode substrate and a negative composite. The positive electrode, the isolation layer, and the negative electrode may be stacked by pressure-molding the positive electrode substrate, the positive composite, the material for the isolation layer, the negative composite, and the negative electrode substrate at a time. The positive electrode and the negative electrode may be each formed in advance, and stacked by pressure-molding with the isolation layer.

<Energy Storage Apparatus>

The energy storage device and the all-solid-state secondary battery according to an embodiment of the present invention can be mounted as an energy storage unit (battery module) configured by assembling a plurality of energy storage devices or all-solid-state secondary batteries on a power source for automobiles such as electric vehicles (EV), hybrid vehicles (HEV), and plug-in hybrid vehicles (PHEV), a power source for electronic devices such as personal computers and communication terminals, or a power source for power storage, or the like. In this case, the technique of the present invention may be applied to at least one energy storage device or all-solid-state secondary battery included in the energy storage unit.

Figure 2:
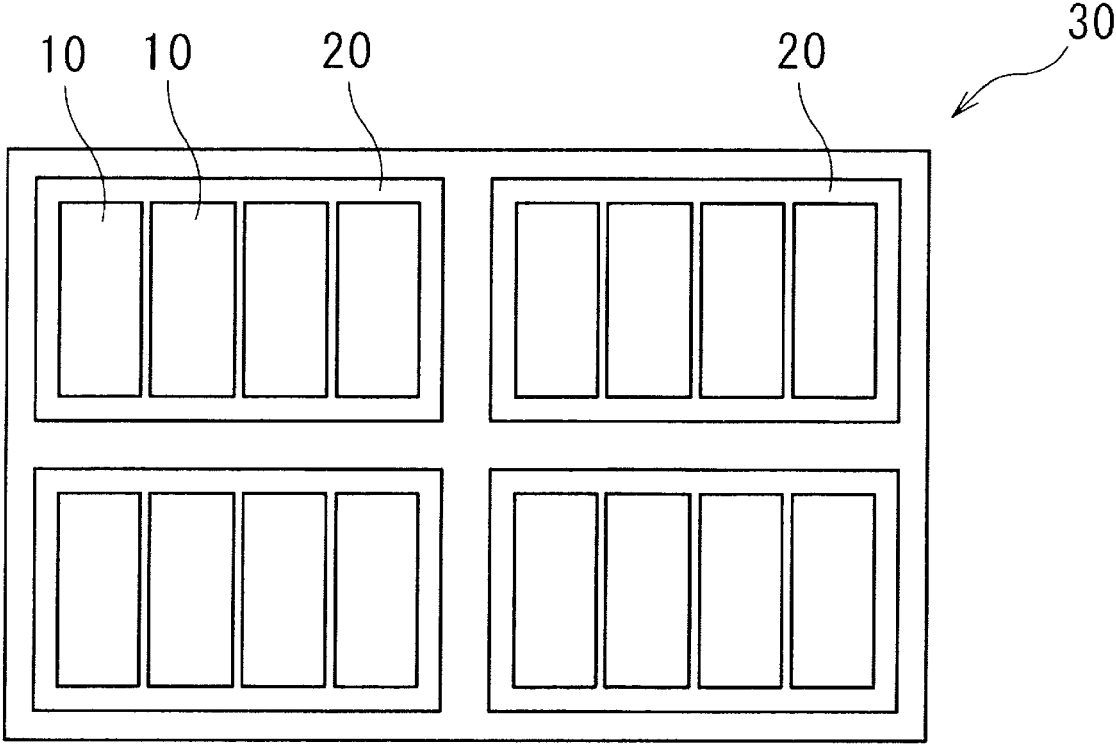
FIG. 2 is a schematic view illustrating an energy storage apparatus configured by aggregating a plurality of energy storage devices according to an embodiment of the present invention.

The energy storage apparatus according to an embodiment of the present invention is an energy storage apparatus including two or more energy storage devices, and one or more of the energy storage devices and/or the all-solid-state secondary batteries according to an embodiment of the present invention. FIG. 2 shows an example of an energy storage apparatus 30 formed by assembling energy storage units 20 in each of which two or more electrically connected energy storage devices 10 are assembled. The energy storage apparatus 30 may include a busbar (not illustrated) for electrically connecting two or more energy storage devices 10, a busbar (not illustrated) for electrically connecting two or more energy storage units 20, and the like. The energy storage unit 20 or the energy storage apparatus 30 may include a state monitor (not illustrated) for monitoring the state of one or more energy storage devices 10.

Other Embodiments

The present invention is not limited to the above embodiments, and various modifications may be made without departing from the gist of the present invention. For example, to the configuration of one embodiment, the configuration of another embodiment can be added, and a part of the configuration of one embodiment can be replaced by the configuration of another embodiment or a well-known technique. Furthermore, part of the configuration of one embodiment can be deleted. In addition, a well-known technique can be added to the configuration of one embodiment.

In the embodiments described above, the energy storage device is an all-solid-state battery that can be charged and discharged, but the type, shape, size, capacity and the like of the energy storage device are not limited. The present invention can also be applied to various secondary batteries, and capacitors such as electric double layer capacitors and lithium ion capacitors. For example, the energy storage device according to the present invention may include a layer other than the positive electrode, the isolation layer, and the negative electrode. The structures of the positive electrode, the isolation layer and the negative electrode are not limited to the above-described structures. In the energy storage device according to the present invention, one or more of layers may contain a liquid. The energy storage device according to the present invention may be, for example, a nonaqueous electrolytic solution energy storage device in which a positive electrode and a negative electrode are stacked with a separator interposed therebetween, and a nonaqueous electrolyte solution is used as an electrolyte.

EXAMPLES

Hereinafter, the present invention will be described in more detail with reference to examples, but the present invention is not limited to the following examples.

Example 1

(Preparation of Coating Agent)

A coating agent was prepared by the following procedure so that a covering layer formed was a composite oxide represented by $LiNb_{0.9}P_{0.1}O_3$. In a glove box with an argon atmosphere, niobium (V) ethoxide ($Nb(OCH_2CH_3)_5$, manufactured by Aldrich), a lithium ethoxide solution (1.0 mol/$dm^3$ $C_2H_5OLi$ in ethanol, manufactured by Aldrich) and phosphoric acid powder (manufactured by Aldrich) were added to super dehydrated ethanol (manufactured by FUJI-FILM Wako Pure Chemical Corporation) to prepare a coating agent. Here, the amounts of the niobium (V) ethoxide, the lithium ethoxide solution and the phosphoric acid powder mixed were adjusted so that the molar ratio of niobium atoms lithium atoms phosphorus atoms in the coating agent was 9:10:1.

(Production of Active Material Particles)

As a particulate active material base material, $LiNi_{1/2}Co_{1/5}Mn_{3/10}O_2$ as a positive active material was provided. The surface of the active material base material was covered with a coating agent by rolling fluidized coating, followed by drying. As an apparatus for performing rolling fluidized coating, "FD-MP-micro" manufactured by Powrex Corporation was used. The temperature of the air inlet of the apparatus in coating was set to 100° C. The amount of covering with the coating agent was adjusted so that covering layer was formed at 0.50% with respect to the active material base material.

Subsequently, the active material base material covered with the coating agent in a dried state was heat-treated in an air atmosphere to obtain active material particles. The heat treatment time was 30 minutes, and the heat treatment temperature was 400° C.

Separately, the coating agent was dried and heat-treated under the above-described conditions to obtain powder, and powder X-ray diffraction measurement was performed on the obtained powder by the above-described method to confirm that the powder had a crystal structure. Therefore, the covering layer of the obtained active material particles is considered to contain $LiNb_{0.9}P_{0.1}O_3$ having a crystal structure.

(Production of Energy Storage Device)

Using the obtained active material particles, an energy storage device (all-solid-state battery) of Example 1 was produced in the following manner.

In a glove box with an argon atmosphere, the active material particles, a sulfide-based solid electrolyte ($Li_6PS_5Cl$), a conductive agent (acetylene black), and a binder (SBR) were weighed at 66.5:28.5:2:3 (mass ratio). First, the active material particles, the sulfide-based solid electrolyte and the conductive agent were mixed in an agate mortar. Next, to this mixture were added a binder and butyl acetate as a solvent, and the mixture was mixed by a hybrid mixer to obtain a positive electrode paste. The obtained positive electrode paste was applied onto an aluminum foil (average thickness: 20 µm) as a positive electrode substrate using YBA Baker Applicator so that the weight per unit area of the positive active material layer after drying of the solvent was 15 mg·cm$^{-2}$ or more and 25 mg·cm$^{-2}$ or less. This was dried in a dryer with an argon atmosphere at 100° C. under normal pressure for 10 minutes, and then under reduced pressure for 10 minutes to form a positive active material layer on the positive electrode substrate. This was cut into a circle with a diameter of 10 mm to obtain a positive electrode for evaluation.

Next, 80 mg of a sulfide-based solid electrolyte (Li$_6$PS$_5$Cl) was inserted into a ceramic powder molding device having an inner diameter of 10 mm, and press-molded with a single-screw press at a pressure of 100 MPa for several seconds to form an isolation layer. The pressure was released, the produced positive electrode was then stacked on one surface of the isolation layer with the positive active material layer facing the isolation layer, and a pressure of 360 MPa was applied with a single-screw press for 5 minutes. The pressure was released, an indium foil (average thickness: 300 μm, diameter: 8 mm, manufactured by The Nilaco Corporation) and a lithium foil (average thickness: 300 μm, diameter: 6 mm, manufactured by Honjo Metal Co., Ltd.) as a negative electrode, and a SUS 316 foil (manufactured by The Nilaco Corporation) as a negative electrode substrate were then stacked on a surface of the positive electrode on a side opposite to the laminated surface, and a pressure of 50 MPa was applied with a single-screw press for several seconds. This was taken out from the ceramic powder molding device to obtain an energy storage device (all-solid-state battery) of Example 1.

Examples 2 to 10 and Comparative Example 1

Active material particles and energy storage devices of Examples 2 to 10 and Comparative Example 1 were produced in the same manner as in Example 1 except that the coating agent was prepared and the amount of covering with the coating agent is adjusted so that the composition of the covering layer, and the content of the covering layer to the active material base material are as described in Table 1.

3.75 V. With regard to the charge termination conditions, charge was performed until the charge current reached 0.025 C. This was followed by a break period of 10 minutes. Thereafter, constant current discharge was performed at a discharge current of 0.1 C and an end-of-discharge voltage of 2.25 V. This was followed by a break period of 10 minutes.

Subsequently, constant current constant voltage charge was performed at a charge current of 0.1 C and an end-of-charge voltage of 3.75 V. With regard to the charge termination conditions, charge was performed until the charge current reached 0.025 C. This was followed by a break period of 10 minutes. Thereafter, constant current discharge was performed at a discharge current of 1.0 C and an end-of-discharge voltage of 2.25 V.

A discharge capacity (0.1 C discharge capacity) in initial charge-discharge, a ratio of the discharge capacity to the charge capacity (charge-discharge efficiency) in initial charge-discharge, and a ratio of a discharge capacity at a discharge current of 1.0 C to a discharge capacity at a discharge current of 0.1 C (discharge capacity ratio 1 C/0.1 C) were determined. The results are shown in Table 1.

(2) Charge-Discharge Cycle Test

Subsequently, a charge-discharge cycle test was conducted at a temperature of 50° C. on each energy storage device in the following manner.

Constant current constant voltage charge was performed at a charge current of 0.2 C and an end-of-charge voltage of 3.75 V. With regard to the charge termination conditions, charge was performed until the charge current reached 0.05 C. Thereafter, constant current discharge was performed at a discharge current of 0.2 C and an end-of-discharge voltage of 2.25 V. The charge and the discharge were each followed by a break time of 10 minutes. This charge-discharge was performed 50 cycles. The discharge capacity at the 50th cycle was divided by the discharge capacity at the 1st cycle to determine a capacity retention ratio. The measurement results are shown in Table 1.

TABLE 1

| | | | Evaluation | | | |
|---|---|---|---|---|---|---|
| | Covering layer | | 0.1 C discharge | Charge-discharge | Discharge capacity | Capacity |
| | Composition | Content/ mass % | capacity/ mAhg$^{-1}$ | efficiency/ % | ratio 1 C/ 0.1 C/% | retention ratio/% |
| Example 1 | LiNb$_{0.9}$P$_{0.1}$O$_3$ | 0.50 | 175.5 | 84.7 | 84.9 | 94.6 |
| Example 2 | | 0.75 | 175.2 | 86.0 | 81.1 | 95.2 |
| Example 3 | | 1.00 | 178.9 | 85.9 | 81.0 | 95.7 |
| Example 4 | LiNb$_{0.8}$P$_{0.2}$O$_3$ | 0.50 | 167.9 | 84.1 | 71.7 | 94.6 |
| Example 5 | | 0.75 | 165.0 | 83.5 | 61.3 | 95.6 |
| Example 6 | | 1.00 | 166.3 | 83.1 | 69.4 | 95.5 |
| Example 7 | | 1.50 | 153.5 | 78.0 | 45.4 | 96.0 |
| Example 8 | LiNb$_{0.5}$P$_{0.5}$O$_3$ | 0.50 | 168.0 | 85.3 | 76.3 | 96.6 |
| Example 9 | | 0.75 | 158.4 | 81.5 | 55.4 | 98.6 |
| Example 10 | | 1.00 | 155.0 | 80.0 | 54.7 | 96.3 |
| Comparative Example 1 | LiNbO$_3$ | 0.75 | 170.4 | 85.4 | 82.8 | 94.1 |

[Evaluation 1]

(1) Capacity Confirmation Test 1

A capacity confirmation test 1 was conducted at a temperature of 50° C. on each of the obtained energy storage devices in the following manner.

Constant current constant voltage charge was performed at a charge current of 0.1 C and an end-of-charge voltage of As shown in Table 1, each of the energy storage devices of Examples 1 to 10 has a higher capacity retention ratio after a charge-discharge cycle as compared to the energy storage device of Comparative Example 1. For example, comparison of Examples 2, 5 and 9, whose contents of the covering layer are equally 0.75% by mass, shows that the capacity retention ratio becomes higher as the content of phosphorus atoms with respect to the total amount of niobium atoms and phosphorus atoms is increased. On the other hand, the 0.1 C discharge capacity, the charge-discharge efficiency and the discharge capacity ratio 1 C/0.1 C tend to be enhanced as the content of phosphorus atoms becomes smaller. The capacity retention ratio tends to become relatively higher as the content of the covering layer with respect to the content of the active material base material is increased. However, it can be seen that if the content of the covering layer is increased to 1.50% by mass as in, for example, Example 7, the 0.1 C discharge capacity, the charge-discharge efficiency and the discharge capacity ratio of 1 C/0.1 C tend to decrease although there is no influence on the capacity retention ratio.

Example 11

(Preparation of Solution Applied to Base Material)

A solution to be applied to the base material was prepared by the following procedure so as to obtain a composition ratio of $LiNbO_{2.9}Br_{0.2}$. In a glove box with an argon atmosphere, niobium (V) ethoxide ($Nb(OCH_2CH_3)_5$, manufactured by Aldrich), a lithium ethoxide solution (1.0 mol/$dm^3$ $C_2H_5OLi$ in ethanol, manufactured by Aldrich) and lithium bromide (manufactured by Aldrich) were added to super dehydrated ethanol (manufactured by FUJIFILM Wako Pure Chemical Corporation) to prepare a solution to be applied to the base material. The amounts of the niobium (V) ethoxide, the lithium ethoxide solution and the lithium bromide mixed were adjusted so that the molar ratio of niobium atoms:lithium atoms bromine atoms in the solution to be applied to the base material was 5:5:1.

(Production of Particulate Positive Active Material)

As a base material, powder of $LiNi_{0.5}Co_{0.2}Mn_{0.3}O_2$ as a lithium transition metal composite oxide having an $\alpha$-$NaFeO_2$-type crystal structure was provided. The solution to be applied to the base material was uniformly applied to the surfaces of the base material particles by rolling fluidized coating. As an apparatus for performing rolling fluidized coating, "FD-MP-micro" manufactured by Powrex Corporation was used. The temperature of the air inlet of the apparatus in coating was set to 140° C. The charge amount of the solution to be applied to the base material was adjusted so that the amount of the surface layer formed was 0.50% by mass with respect to the base material.

Subsequently, the base material in which ethanol was removed by drying from the solution applied to the base material, on the surfaces of the base material particles, was heat-treated under an air atmosphere to form a surface layer, thereby obtaining positive active material particles for an all-solid-state secondary battery in Example 11. The heat treatment time was 30 minutes, and the heat treatment temperature was 400° C. Hereinafter, the term "positive active material particles for an all-solid-state secondary battery" is sometimes abbreviated simply as "active material particles".

By the above-described method, the surface layer of the obtained active material particle was confirmed to be crystalline. Specifically, a solution prepared in the same procedure as that for the solution applied to the base material was heated under the same conditions as those in the production of the positive active material to obtain sample powder. Subsequently, the obtained sample powder was subjected to X-ray diffraction measurement. The X-ray diffraction measurement was performed by the above-described method. When a peak derived from the crystal structure was observed in the obtained X-ray diffraction diagram, it was determined that the surface layer was crystalline. From this result and the composition of the solution applied to the base material, it is considered that the surface layer of the obtained active material particle is crystalline, and the composition formula thereof is $LiNbO_{2.9}Br_{0.2}$.

(Production of all-Solid-State Secondary Battery)

Using the obtained active material particles, an all-solid-state secondary battery of Example 11 was produced in the following manner.

In a glove box with an argon atmosphere, the active material particles, a sulfide solid electrolyte ($Li_6PS_5Cl$) and a conductive agent (acetylene black) were mixed in an agate mortar. Subsequently, to this mixture were added a binder (SBR) and butyl butylate as a solvent, and the mixture was mixed by a hybrid mixer to obtain a positive composite. The obtained positive composite was applied onto an aluminum foil (average thickness: 20 μm) as a positive electrode substrate using YBA Baker Applicator so that the weight per unit area of the positive active material layer after drying of the solvent was 15 mg·cm$^{-2}$ or more and 25 mg·cm$^{-2}$ or less. This was dried in a dryer with an argon atmosphere set at a temperature allowing the solvent to volatilize, thereby forming a positive active material layer on the positive electrode substrate. This was cut into a circle with a diameter of 10 mm to obtain a positive electrode for evaluation.

Subsequently, 80 mg of a sulfide solid electrolyte ($Li_6PS_5Cl$) was inserted into a ceramic powder molding device having an inner diameter of 10 mm, and press-molded with a single-screw press at a pressure of 100 MPa for several seconds to form an isolation layer. The pressure was released, the produced positive electrode was then placed on one surface of the isolation layer, and pressure molding was performed with a single-screw press at 360 MPa for 5 minutes. The pressure was released, an indium foil (average thickness: 300 μm, diameter: 8 mm, manufactured by The Nilaco Corporation) and a lithium foil (average thickness: 300 μm, diameter: 6 mm, manufactured by Honjo Metal Co., Ltd.) as a negative electrode, and a SUS 316L foil (manufactured by The Nilaco Corporation) as a negative electrode substrate were then placed on a surface of the positive electrode on a side opposite to the bonded surface, and bonding was performed with a single-screw press at 50 MPa for several seconds. This was taken out from the ceramic powder molding device to obtain an all-solid-state secondary battery of Example 11.

Example 12

Active material particles and an all-solid-state secondary battery of Example 12 were produced in the same manner as in Example 11 except that lithium bromide in the solution to be applied to the base material was replaced by lithium iodide, and the surface layer had a composition of $LiNbO_{2.9}I_{0.2}$. By the same method as in Example 11, the surface layer of the obtained active material particle was confirmed to be crystalline.

Comparative Example 2

Active material particles and an all-solid-state secondary battery of Comparative Example 2 were produced in the same manner as in Example 11 except that lithium bromide was not used for the solution to be applied to the base material, and the surface layer had a composition of $LiNbO_3$. By the same method as in Example 11, the surface layer of the obtained active material particle was confirmed to be amorphous.

Comparative Example 3

Active material particles and an all-solid-state secondary battery of Comparative Example 3 were produced in the same manner as in Example 11 except that lithium bromide in the solution to be applied to the base material was replaced by lithium chloride, and the surface layer had a composition of $LiNbO_{2.9}Cl_{0.2}$. By the same method as in Example 11, the surface layer of the obtained active material particle was confirmed to be amorphous.

Reference Example 1

Active material particles and an all-solid-state secondary battery secondary battery of Reference Example 1 were produced in the same manner as in Example 11 except that the surface layer was not formed on the base material.
[Evaluation 2]
　　<Capacity Confirmation Test 2>
A capacity confirmation test 2 was conducted at 50° C. on each of the obtained all-solid-state secondary batteries in the following manner.

Constant current constant voltage charge was performed at a charge current of 0.1 C and an end-of-charge voltage of 3.75 V. With regard to the charge termination conditions, charge was performed until the charge current reached 0.025 C. This was followed by a break period of 10 minutes. Thereafter, constant current discharge was performed at a discharge current of 0.1 C and an end-of-discharge voltage of 2.25 V.

The percentage of the discharge capacity to the charge capacity in the initial charge-discharge was determined, and defined as initial charge-discharge efficiency. The results are shown in Table 2.

TABLE 2

| | Composition formula of surface layer | State of surface layer | Initial charge-discharge efficiency/% |
|---|---|---|---|
| Example 11 | $LiNbO_{2.9}Br_{0.2}$ | Crystalline | 85.5 |
| Example 12 | $LiNbO_{2.9}I_{0.2}$ | Crystalline | 84.6 |
| Comparative Example 2 | $LiNbO_3$ | Amorphous | 84.0 |
| Comparative Example 3 | $LiNbO_{2.9}Cl_{0.2}$ | Amorphous | 82.3 |
| Reference Example 1 | — | — | 83.0 |

From Table 2, it can be seen that with the positive active materials of examples which include, on a surface of a base material including a substance capable of storing and releasing lithium ions, a surface layer containing a lithium element, a niobium element, an oxygen element and a halogen element and satisfying $0<c \leq 1.0$ where c is a ratio of a total number of moles of the halogen to a number of moles of the niobium, an all-solid-state secondary battery having higher initial charge-discharge efficiency over all-solid-state secondary batteries obtained with the positive active materials of comparative examples which include an amorphous surface layer or the positive active material of the reference example which does not include a surface layer. From the results of Comparative Example 2, Comparative Example 3 and Reference Example 1, it can be seen that when the positive active material includes an amorphous surface layer containing halogen, the initial charge-discharge efficiency is lower than when the surface layer does not contain halogen and when the positive electrode active material does not include a surface layer. From the above results, it can be said that the effect of enhancing the initial charge-discharge efficiency when the surface layer contains a lithium element, a niobium element, an oxygen element and a halogen element is unique to a case where the surface layer is crystalline.

INDUSTRIAL APPLICABILITY

The present invention can be applied to an energy storage device used as a power source for electronic devices such as personal computers and communication terminals, automobiles, and the like, and an electrode and the like provided in the nonaqueous electrolyte energy storage device.

DESCRIPTION OF REFERENCE SIGNS

1: positive electrode
2: negative electrode
3: isolation layer
4: positive electrode substrate
5: positive active material layer
6: negative active material layer
7: negative electrode substrate
10: energy storage device (all-solid-state secondary battery)
20: energy storage unit
30: energy storage apparatus

The invention claimed is:

1. An active material particle comprising an active material base material and a covering layer covering at least a part of a surface of the active material base material,
　wherein the covering layer contains niobium atoms and phosphorus atoms, and a content of the phosphorus atoms with respect to a total content of the niobium atoms and the phosphorus atoms in the covering layer is more than 0 mol % and 80 mol % or less.

2. The active material particle according to claim 1, wherein the covering layer contains a composite oxide containing the niobium atoms and the phosphorus atoms.

3. The active material particle according to claim 2, wherein the composite oxide is represented by the following formula 1:

$$Li_xNb_{(1-y)}P_yO_zA_w \qquad\qquad 1$$

wherein A represents one or more elements other than Li, Nb, P and O; x is a number of more than 0 and 2 or less; y is a number of more than 0 and 0.8 or less; z is a number of 2 or more and 4 or less; and w is a number of 0 or more and 1 or less.

4. The active material particle according to claim 1, wherein a content of the covering layer with respect to a content of the active material base material is 0.01% by mass or more and 2.0% by mass or less.

5. A positive active material for an all-solid-state secondary battery, comprising a base material including a substance capable of storing and releasing lithium ions, and a surface layer which is present on a surface of the base material, contains a lithium element, a niobium element, an oxygen element and a halogen element, and satisfies $0<c \leq 1.0$ where c is a ratio of a total number of moles of the halogen to a number of moles of the niobium, with the surface layer being crystalline.

6. The positive active material for an all-solid-state secondary battery according to claim 5, wherein the halogen is at least one selected from bromine and iodine.

7. The positive active material for an all-solid-state secondary battery according to claim 5, wherein the surface layer is represented by the composition formula of $Li_aNbO_bX_c$ (where X is halogen, and a, b and c are real numbers satisfying $0.5 \leq a \leq 1.5$, $2.5 \leq b \leq 3.5$ and $0 < c \leq 1.0$, respectively).

8. An electrode comprising the active material particle according to claim 1.

9. An energy storage device comprising the electrode according to claim 8.

10. An all-solid-state secondary battery comprising the electrode according to claim 8.

11. A method for producing active material particles, comprising, in an order presented, covering at least a part of a surface of a particulate active material base material with a coating agent containing niobium atoms and phosphorus atoms, and heat-treating the active material base material covered with the coating agent, wherein a content of the phosphorus atoms with respect to a total content of the niobium atoms and the phosphorus atoms in the coating agent is more than 0 mol % and 80 mol % or less.

12. An energy storage apparatus comprising two or more energy storage devices, and one or more of the energy storage devices according to claim 9.

* * * * *